United States Patent [19]

Axelrod

[11] Patent Number: 5,128,153
[45] Date of Patent: Jul. 7, 1992

[54] FISH FOOD PELLET AND METHOD OF FEEDING FISH

[76] Inventor: Herbert R. Axelrod, Deal, N.J.

[21] Appl. No.: 696,039

[22] Filed: May 6, 1991

[51] Int. Cl.$^5$ ................................................. A23K 1/10
[52] U.S. Cl. ........................................... 426/2; 426/89; 426/92; 426/643; 426/646; 426/805; 119/3
[58] Field of Search ..................... 426/1, 88, 94, 92, 2, 426/805, 643, 646; 119/3

[56] References Cited

U.S. PATENT DOCUMENTS

| | | | |
|---|---|---|---|
| 3,314,396 | 4/1967 | Willinger | 119/3 |
| 3,359,114 | 12/1967 | Witteman et al. | 426/1 |
| 3,361,566 | 1/1968 | Axelrod | 426/1 |
| 4,150,162 | 4/1979 | Goldstein | 426/643 |
| 4,400,399 | 8/1983 | Muller | 426/1 |
| 4,634,592 | 1/1987 | Faber et al. | 426/1 |
| 4,664,065 | 5/1987 | Schneider | 119/3 |
| 4,732,766 | 3/1988 | Lindgard | 426/623 |

*Primary Examiner*—R. B. Penland

[57] ABSTRACT

A fish food pellet for aquariums which initially floats while an outer layer of food is released, slowly sinks to the bottom of an aquarium where a second layer of food is released and with the remainder of the pellet returning to the surface. The fish food released by the pellet feeds surface-feeding fish, mid-water fish and bottom-feeding fish. A method for feeding fish in an aquarium utilizing such pellet is disclosed.

3 Claims, 1 Drawing Sheet

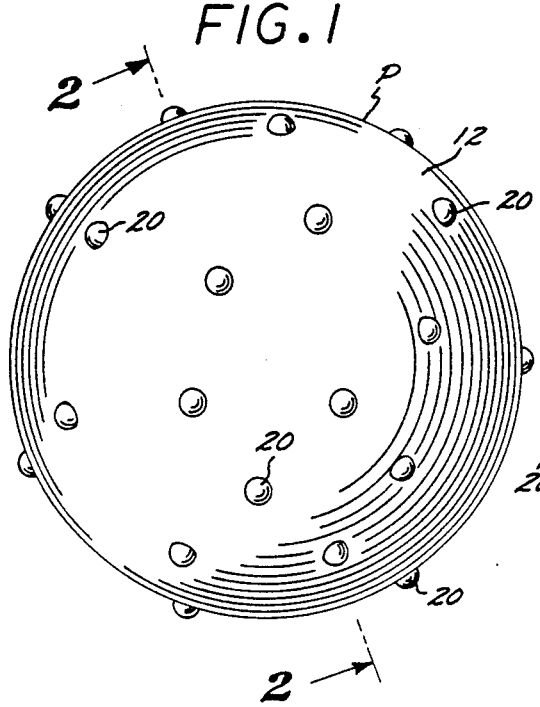
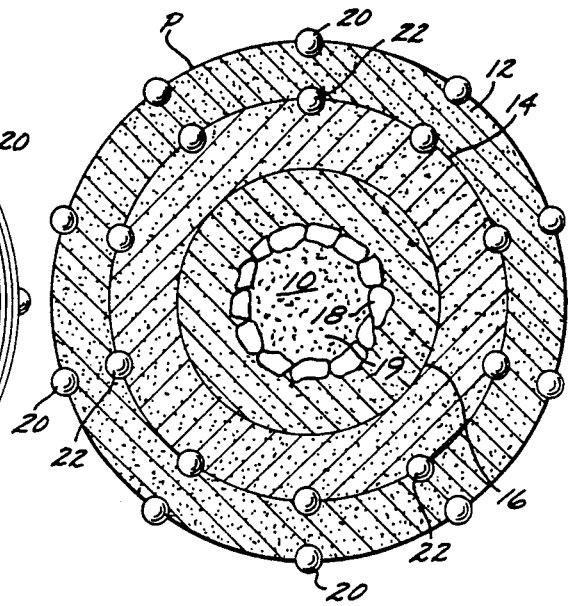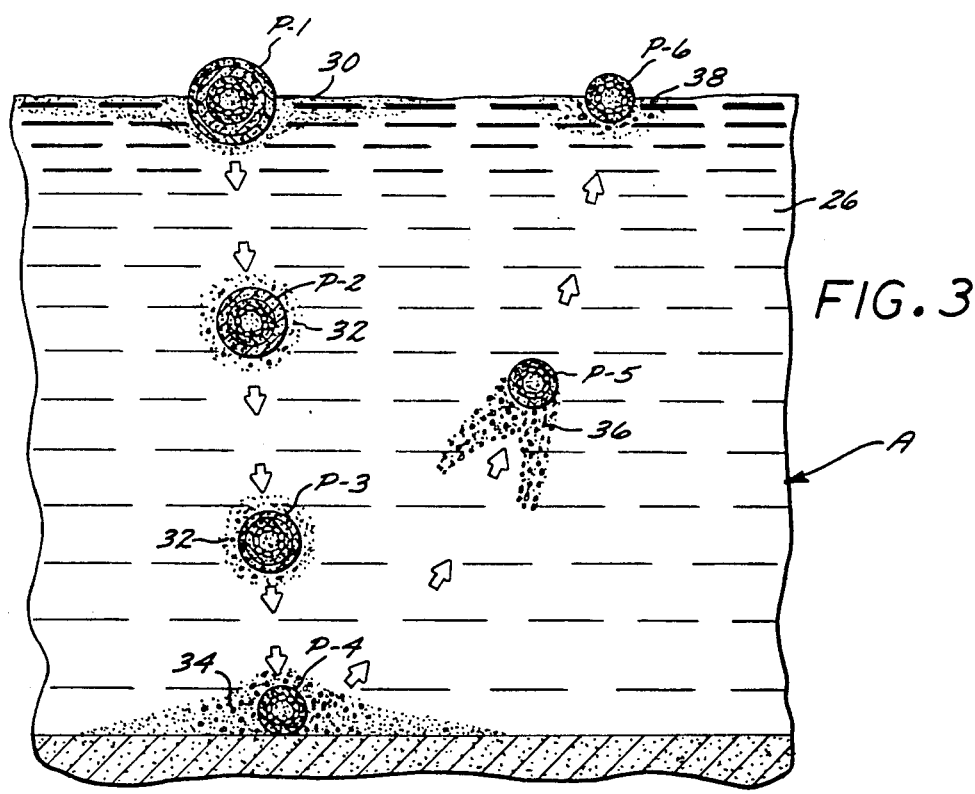

FISH FOOD PELLET AND METHOD OF FEEDING FISH

BACKGROUND OF THE INVENTION

This invention relates to improvements in fish food pellets and methods of feeding fish particularly adapted for use in aquariums housing different types of fish, some of which feed on the surface, some at mid-water, and some on the bottom of the aquarium.

The majority of fish aquarium hobbyists are not aware of the proper quantity of food to feed their fish. In most cases, they place fish food in their aquariums in greater quantities than that actually required to maintain the fish. Such overfeeding causes pollution of the aquarium water, cloudiness of such water, foul odors emanating from the aquarium, and in many cases eventual death for the inhabitants of the aquarium.

SUMMARY OF THE INVENTION

According to one embodiment, the present invention provides a single fish food pellet which will attract all types of fishes housed in an aquarium, i.e., fish which feed at the surface area of the aquarium, fish which feed from the mid-water area of the aquarium and fish which feed on the bottom of the aquarium. Such object is achieved by providing a fish food pellet which when placed in an aquarium will initially float on the surface of the water therein while an outer layer of food is released, with the pellet then slowly sinking to the bottom of the aquarium where a second layer of food is released, and after a predetermined amount of time, the remainder of the pellet will return to the surface of the aquarium. With this arrangement, the surface-feeding fish are initially fed. The mid-water fish are fed first as the pellet sinks and then again as the pellet returns to the water surface. The bottom feeding fish are fed when the pellet is resting at the bottom of the aquarium. Finally, the surface-feeding fish are again fed when the pellet returns to the top of the aquarium. The time required for the pellets to sink and then return to the surface generally corresponds to the time required for a single feeding of the fish in the aquarium. Then, the uneaten food can easily be scooped off the surface with the usual fish dip net.

According to another embodiment of the invention, I provide, a method for feeding fish in an aquarium, especially an aquarium which houses surface-feeding, mid-water feeding and bottom feeding fish. My method comprises introducing at the surface of the water in the aquarium a fish food pellet formed of a plurality of concentric dislodgeable food material containing layers, the densities of such layers being selected such that the pellet has a positive buoyancy upon initial contact with water, acquires a slightly negative buoyancy upon dislodgement of the first outer layer and reacquires a positive buoyancy upon dislodgement of the second inner layer, contacting said pellet with water to dislodge said first outer layer and cause the remainder of said pellet to sink toward the bottom of the aquarium, continuing contact of the pellet with water to dislodge the next inner layer, causing said pellet to rise to the surface of the water in the aquarium. The time period required for the pellet to sink to the bottom and then rise to the surface corresponds generally to the time required for a single feeding of the fish in the aquarium. After the remainder of the pellet rises to the surface of the water, any excess food material is removed by skimming from the surface.

BRIEF DESCRIPTION OF THE DRAWINGS

For the purpose of illustrating the present invention, there is shown in the drawings a form of fish pellet which is presently preferred; it being understood, however, that the invention is not limited to the precise arrangements and instrumentalities shown.

FIG. 1 is a side elevational view of a preferred form of fish pellet embodying the present invention.

FIG. 2 is a sectional view taken along line 22 of FIG. 1, and

FIG. 3 is a side elevational view in reduced scale showing how a fish food pellet embodying the invention moves within the water of an aquarium so as to feed the fish housed therein.

DETAILED DESCRIPTION OF THE INVENTION

Referring to the drawings, there is shown a preferred form of fish food pellet P embodying the present invention which is dropped into an aquarium A housing fish (not shown) to be fed by means of such fish food pellet.

More particularly, referring to FIGS. 1 and 2, fish food pellet P preferably takes the form of a multi-layer ball having a central cavity 10. The outermost layer of the pellet is defined by a concentric coating 12 formed of a first fish food, preferred by surface-feeding fish. The second or intermediate layer 14 of the pellet is defined by a concentric body formed of a second fish food preferred by mid-water fish. The third layer 16 of the fish pellet is defined by a concentric body formed of a third fish food 16 preferred by bottom-feeding fish. The inner surface of the third layer 16 of the fish food is covered with a plurality of gas-releasing pellets 18 embedded within the material of layer 16 and which defines the outer boundary of the cavity 10. Cavity 10 may be hollow, or alternatively, filled with loosely packed fish food 19. A plurality of oil or fat globules 20 having a density lower then that of water are embedded within the outer surface of the outer layer 12 of fish food. A second plurality of similar oil or fat globules 22 are embedded between the inner portion of the outer fish layer 12 and the intermediate fish food portion layer 14. It should be understood that the globules 20 and 22 initially cling to the fish food of layers 12 and 14 but are freed from such fish food when contacted by water. It should also be noted that the fish food of intermediate layer 14 is packed harder than that of outer layer 12.

Referring now additionally to FIG. 3, there is shown the mode of operation of the preferred form of fish food pellet P. When pellet P is dropped into the water 26 of the aquarium A, it will initially float at the positive buoyancy position designated P-1, i.e., at the upper surface of water 26 due to the buoyancy of the outer globules 20 (not shown in the interest of clarity). Globules 20 enable the pellet P to remain in its floating condition until such time as the aquarium water softens the outer layer 12 of fish food and the globules 20 are dislodged. While the pellet floats, the outer layer 12 of fish food is loosened by the aquarium water 26 and floats free of the pellet P as indicated at 30, so as to be available as globules 20 are dislodged to feed surface-dwelling fish. The remainder of the pellet will develop a slightly negative buoyancy and slowly start to sink toward the bottom of the aquarium A as indicated at P-2 and P-3. The rate of ascent of the remainder of the pellet will be controlled by the tightness with which food layer 16 is packed and the combined volume of the globules 22. Preferably, the pellet will sink to the bottom of the aquarium over a period of about ten minutes. As the pellet sinks toward the bottom of the aquarium the center layer 14 of fish food is loosened by the aquarium water 26 so as to be available to the fish which inhabit the mid-water portion of the aquarium, as indicated at 32. When the pellet settles on the bottom of the aquarium, as indicated at P-4, the innermost layer 16 of fish food will be softened and then loosened by the aquarium water so as to become available for consumption by the fish which inhabit the bottom of the aquarium, as indicated at 34.

It should be understood that the innermost layer of fish food 16 is sufficiently porous that water can infuse therethrough into contact with the gas-releasing crystals 18. Accordingly, before all of the innermost layer 16 of fish food is deposited onto the bottom portion of the aquarium, (not shown), gas generated by crystals 18 will flow into the center cavity 10 and the innermost fish food layer 16. The remainder of the pellet will then slowly rise toward the surface of the aquarium water 26 as shown at P-5. During the ascent of the pellet food, particles from layer 16 will be released, with a portion thereof being available for the mid-water fish if such fish are still hungry, as indicated at 36 in FIG. 3. Any of such food particles 36 not consumed by the mid-water fish will rise to the surface of the aquarium water 26 as the remainder of the pellet also returns to the surface of the aquarium water to position designated P-6 in FIG. 3. Such food particles, as well as the food particles 19 from cavity 10 and the remainder of layer 16 will float on the surface of the water for consumption by the fish which inhabit the upper portion of the aquarium, as indicated at 38. The aquarium hobbyist can easily scoop any fish food remaining after the surface fish complete their feeding with a scoop so as to prevent pollution of the aquarium. This permits the hobbyist to gauge the quantity of pellets he should utilize at each feeding, i.e., if a considerable amount of fish food remains floating on the surface of the aquarium water after the fish stop feeding, the hobbyist will realize that he should use fewer fish pellets when feeding the fish in the future. Conversely, if no fish food remains on the surface, he may increase the number of pellets at the next feeding.

It has been determined that the surface-feeding layer 12 preferably includes brine shrimp, intermediate layer 14 preferably includes a fish meal, such as menhaden, and inner layer 16 includes an algae-based food such as chlorella. Globules 20 and 22 will preferably take the form of hydrogenized animal shortening. The gas-releasing crystals 20 may be formed of any suitable non-toxic fusion granulation mixture used in manufacturing effervescent medicinal tablets, for example, an stoichiometric mixture of sodium bicarbonate and citric acid. If cavity 10 is filled-in, the filler may include loosely packed fish meal, such as Menhaden.

EXAMPLE

The following example is presented to illustrate the presently preferred embodiment of my invention and is not intended to limit the scope of the invention, which is defined in the appended claims.

Brine shrimp (4 grams) are loosely compacted by hand to form a ¼ diameter inner ball. One gram of a granulation fusion mixture comprising 45 wt % citric acid, 40 wt % sodium bicarbonate and 15 wt % glycerin is mixed uniformly with the shrimp ball.

Four grams of Menhaden fish meal if mixed with 1 gram glycerine to form a loosely packed self-supporting mixture. This mixture is hand formed as a 1/16" thick layer around the coated inner ball.

A small spatula is used to place 1 gram of hydrogenated lard in 15 small dabs on the surface of the fish meal layer.

Four grams of brine shrimp and 4 grams of glycerine are mixed for form a loosely compacted self-supporting mixture. This mixture is hand formed as a 1/16" thick layer around the Menhaden fish meal layer.

Approximately 2 grams of the lard is applied to the surface of the brine shrimp layer in 30 small dabs.

The resulting multi-layer ball may be frozen, freeze dried or heat dried (coded) and wrapped in aluminum foil until ready for use.

Various modifications and changes may be made with respect to the foregoing detailed description without departing from the spirit of the invention.

What is claimed:

1. A fish food pellet, consisting essentially of
   a core and a plurality of concentric dislodgeable food material containing layers having sequential weight densities, said densities selected so that the buoyancy of the pellet is altered as outer layers become dislodged during contact with water in an aquarium containing fish, the period of time required for said alteration of buoyancy generally corresponding to the time required for a single feeding of said fish;
   the densities of said layers being selected so that said pellet has a positive buoyancy upon initial contact with water, acquires a slightly negative buoyancy upon dislodgement of a first layer, and a reacquires a positive buoyancy upon dislodgement of a second layer,
   wherein a substance that releases gas upon contact with water is disposed at the core of said pellet such that gas released therefrom displaces water that has intruded into the core after dislodgement of the first and second layers to decrease the pellet's density and impart a positive buoyancy thereto;
   said layers being dislodged without substantially dispersing food material throughout said aquarium and permitting excess food remaining after said feeding to be removed from said aquarium by skimming from the surface of the water therein.

2. The pellet of claim 1 wherein fat globules are employed to decrease weight density.

3. A method for feeding fish in an aquarium containing water comprising:
   (a) introducing at the surface of the water a fish food pellet comprising;
      a core and a plurality of concentric dislodgeable food material containing layers having sequentially weight densities, said densities selected so that the buoyancy of the pellet is altered as outer layers become dislodged during contact with water in an aquarium containing fish, the period of time required for said alteration of buoyancy generally corresponding to the time required for a single feeding of said fish;
      the densities of said layers being selected so that said pellet has a positive buoyancy upon initial contact with water, acquires a slightly negative buoyancy upon dislodgement of a first layer, and reacquires a positive buoyancy upon dislodgement of a second layer;

wherein a substance that releases gas upon contact with water is disposed at the core of said pellet such that gas released therefrom displaces water that has intruded into the core after dislodgement of the first and second layers to decrease the pellet's density and impart a positive buoyancy thereto;

said layers being dislodged without substantially dispersing food material throughout said aquarium and permitting excess food remaining after said feeding to be removed from said aquarium by skimming from the surface of the water therein;

(b) maintaining said pellet in contact with said water to dislodge said first outer layer and cause the remainder of said pellet to sink toward the bottom of the aquarium;

(c) continuing contact of the remainder of said pellet with said water to dislodge the next inner layer thereof, causing said pellet to reacquire a positive buoyancy and rise to the surface of the water; and (d) skimming any excess food material from the surface of the water.

* * * * *